(12) United States Patent　　(10) Patent No.:　US 12,585,783 B2
　　　Islam　　　　　　　　　　　　　(45) Date of Patent:　Mar. 24, 2026

(54) GRAPH-BASED APPROACH TOWARDS HARDWARE TROJAN VULNERABILITY ANALYSIS

(71) Applicant: University of South Florida, Tampa, FL (US)

(72) Inventor: Sheikh Ariful Islam, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 464 days.

(21) Appl. No.: 17/191,038

(22) Filed: Mar. 3, 2021

(65) Prior Publication Data

US 2021/0286881 A1　　Sep. 16, 2021

Related U.S. Application Data

(60) Provisional application No. 62/987,670, filed on Mar. 10, 2020.

(51) Int. Cl.
G06F 21/57　　　　(2013.01)

(52) U.S. Cl.
CPC ...... G06F 21/577 (2013.01); *G06F 2221/034* (2013.01)

(58) Field of Classification Search
None
See application file for complete search history.

(56)　　　　References Cited

U.S. PATENT DOCUMENTS

| | | | | |
|---|---|---|---|---|
| 8,176,454 B2 * | 5/2012 | Potkonjak | ............... | G06F 30/33 |
| | | | | 716/108 |
| 8,219,946 B1 * | 7/2012 | Manovit | ............... | G06F 30/327 |
| | | | | 716/106 |

(Continued)

FOREIGN PATENT DOCUMENTS

| | | | | |
|---|---|---|---|---|
| CN | 112685800 A | * | 4/2021 | |
| WO | WO-2014144857 A2 | * | 9/2014 | ............. G06F 21/55 |
| WO | WO-2020150448 A1 | * | 7/2020 | ............. G06F 21/44 |

OTHER PUBLICATIONS

X. Zhang and M. Tehranipoor, "Case study: Detecting hardware Trojans in third-party digital IP cores," 2011 IEEE International Symposium on Hardware-Oriented Security and Trust, San Diego, Ca, USA, 2011, pp. 67-70, doi: 10.1109/HST.2011.5954998.*

(Continued)

*Primary Examiner* — Syed A Zaidi
*Assistant Examiner* — Vadim Savenkov
(74) *Attorney, Agent, or Firm* — HUSCH BLACKWELL LLP

(57)　　　　ABSTRACT

The present disclosure describes various embodiments of hardware trojan triggering (HTT) signal analysis. As such, an exemplary method comprises capturing switching activity of nodes for a design of an integrated circuit during a simulation of an application of a test pattern to the design; identifying one or more nodes in a graphical representation of the design that do not toggle within an individual window of time across multiple windows of time; determining unique paths that can be formed by the identified nodes within each of the multiple windows of time; determining one or more unique paths that occur across consecutive windows of time; appending the one or more unique paths that occur across consecutive windows of time in a set; and outputting the one or more unique paths in the set as rare trojan horse triggering paths for the design. Other systems and methods are also presented.

15 Claims, 5 Drawing Sheets

(56) References Cited

U.S. PATENT DOCUMENTS

| 8,402,401 | B2 * | 3/2013 | Chakraborty | G09C 1/00 |
| | | | | 713/193 |
| 9,177,119 | B2 * | 11/2015 | Potkonjak | G06F 21/10 |
| 9,513,329 | B2 * | 12/2016 | Potkonjak | G01R 31/2851 |
| 9,569,582 | B2 * | 2/2017 | Arbel | G06F 30/30 |
| 9,916,449 | B2 * | 3/2018 | Sethumadhavan | G06F 21/71 |
| 10,409,994 | B1 * | 9/2019 | Kammler | G06F 30/34 |
| 10,614,187 | B2 * | 4/2020 | Rajendran | G06F 21/79 |
| 11,144,648 | B2 * | 10/2021 | Bhunia | G06F 21/577 |
| 11,270,002 | B2 * | 3/2022 | Tehranipoor | G06F 21/56 |
| 11,449,611 | B2 * | 9/2022 | Schat | G06F 21/577 |
| 11,568,046 | B2 * | 1/2023 | Mishra | G06F 21/554 |
| 11,580,265 | B2 * | 2/2023 | Mishra | G06F 21/566 |
| 2011/0113392 | A1 * | 5/2011 | Chakraborty | G09C 1/00 |
| | | | | 716/102 |
| 2012/0278893 | A1 * | 11/2012 | Jyothi | G06F 21/566 |
| | | | | 726/24 |
| 2012/0317454 | A1 * | 12/2012 | Krenz-Baath | G06F 11/263 |
| | | | | 714/739 |
| 2016/0098558 | A1 * | 4/2016 | Vedula | G06F 21/72 |
| | | | | 726/23 |
| 2016/0098565 | A1 * | 4/2016 | Vedula | G06F 21/76 |
| | | | | 726/24 |
| 2017/0228562 | A1 * | 8/2017 | Guilley | G09C 1/00 |
| 2017/0310688 | A1 * | 10/2017 | Lecomte | H04L 9/3278 |
| 2018/0121585 | A1 * | 5/2018 | Cherupalli | G06F 30/30 |
| 2018/0204002 | A1 * | 7/2018 | Khorrami | G06F 21/566 |
| 2018/0357345 | A1 * | 12/2018 | Cherupalli | G06F 30/398 |
| 2019/0347417 | A1 * | 11/2019 | Tehranipoor | G06F 21/566 |
| 2020/0104485 | A1 * | 4/2020 | Crouch | G06F 21/554 |
| 2020/0302064 | A1 * | 9/2020 | Bhunia | G06F 21/577 |
| 2020/0326373 | A1 * | 10/2020 | Dickens | G01R 31/318328 |
| 2020/0387601 | A1 * | 12/2020 | Schat | G06F 21/552 |
| 2021/0003630 | A1 * | 1/2021 | Mishra | G01R 31/318364 |
| 2021/0049266 | A1 * | 2/2021 | Schat | G06F 21/567 |
| 2021/0097220 | A1 * | 4/2021 | Bhunia | G06N 7/01 |

OTHER PUBLICATIONS

E.-R. Zhou, S. -Q. Li, J. -H. Chen, L. Ni, Z. -X. Zhao and J. Li, "A Novel Detection Method for Hardware Trojan in Third Party IP Cores," 2016 International Conference on Information System and Artificial Intelligence (ISAI), Hong Kong, China, 2016, pp. 528-532, doi: 10.1109/ISAI.2016.0118.*

J. Cruz, F. Farahmandi, A. Ahmed and P. Mishra, "Hardware Trojan Detection Using ATPG and Model Checking," 2018 31st International Conference on VLSI Design and 2018 17th International Conference on Embedded Systems (VLSID), Pune, India, 2018, pp. 91-96, doi: 10.1109/VLSID.2018.43.*

Xiaotong Cui, Elnaz Koopahi, Kaijie Wu, and Ramesh Karri. 2018. Hardware Trojan Detection Using the Order of Path Delay. J. Emerg. Technol. Comput. Syst. 14, 3, Article 33 (Jul. 2018), 23 pages. https://doi.org/10.1145/3229050.*

Ranjbar, O., Bayat-Sarmadi, S., Pooyan, F. et al. A Unified Approach to Detect and Distinguish Hardware Trojans and Faults in SRAM-based FPGAs. J Electron Test 35, 201-214 (2019). https://doi.org/10.1007/s10836-019-05783-2.*

S. Narasimhan, X. Wang, D. Du, R. S. Chakraborty and S. Bhunia, "TeSR: A robust Temporal Self-Referencing approach for Hardware Trojan detection," 2011 IEEE International Symposium on Hardware-Oriented Security and Trust, San Diego, CA, USA, 2011, pp. 71-74, doi: 10.1109/HST.2011.5954999.*

Basak Chowdhury, A. (2016). Optimized ATPG for hardware trojan detection (Doctoral dissertation, Indian Statistical Institute, Kolkata).*

X. Chen et al., "Hardware Trojan Detection in Third-Party Digital Intellectual Property Cores by Multilevel Feature Analysis," in IEEE Transactions on Computer-Aided Design of Integrated Circuits and Systems, vol. 37, No. 7, pp. 1370-1383, Jul. 2018, doi: 10.1109/TCAD.2017.2748021.*

Q. Liu, P. Zhao and F. Chen, "A Hardware Trojan Detection Method Based on Structural Features of Trojan and Host Circuits," in IEEE Access, vol. 7, pp. 44632-44644, 2019, doi: 10.1109/Access.2019.2908088.*

Shakya, B., He, T., Salmani, H., Forte, D., Bhunia, S., & Tehranipoor, M. (2017). Benchmarking of hardware trojans and maliciously affected circuits. Journal of Hardware and Systems Security, 1, 85-102.*

S. Deyati, B. J. Muldrey and A. Chatterjee, "Trojan detection in digital systems using current sensing of pulse propagation in logic gates," 2016 17th International Symposium on Quality Electronic Design (ISQED), Santa Clara, CA, USA, 2016, pp. 350-355, doi: 10.1109/ISQED.2016.7479226.*

Banga et al., Guided Test Generation for Isolation and Detection of Embedded Trojans in ICs, in Proceedings of the 18th ACM Great Lakes Symposium on VLSI, 2008, pp. 363-366.

Cha et al., Efficient Trojan Detection Via Calibration of Process Variations, in 2012 IEEE 21st Asian Test Symposium, pp. 355-361.

Chakraborty et al., MERO: A Statistical Approach for Hardware Trojan Detection, in International Workshop on Cryptographic Hardware and Embedded Systems, 2009, pp. 396-410.

Cherupalli et al., Graph-Based Dynamic Analysis: Efficient Characterization of Dynamic Timing and Activity Distributions, in 2015 IEEE/ACM International Conference on Computer-Aided Design (ICCAD), pp. 729-735.

Cruz et al., An Automated Configurable Trojan Insertion Framework for Dynamic Trust Benchmarks, in 2018 Design, Automation & Test in Europe Conference & Exhibition, pp. 1610-1615.

Exurville et al., Resilient Hardware Trojans Detection Based on Path Delay Measurements, in 2015 IEEE International Symposium on Hardware Oriented Security and Trust (HOST), pp. 151-156.

Hu et al., Detecting Hardware Trojans with Gate-Level Information-Flow Tracking, Computer (Published by the IEEE Computer Society), Aug. 2016, pp. 44-52.

Huang et al., MERS: Statistical Test Generation for Side-Channel Analysis Based Trojan Detection, iIn Proceedings of the 2016 ACM SIGSAC Conference on Computer and Communications Security, pp. 130-141.

Islam et al., Empirical Word-Level Analysis of Arithmetic Module Architectures for Hardware Trojan Susceptibility, in 2018 Asian Hardware Oriented Security and Trust Symposium (AsianHOST), pp. 109-114.

Ismari et al., On Detecting Delay Anomalies Introduced by Hardware Trojans, in 2016 IEEE/ACM International Conference on Computer-Aided Design (ICCAD), pp. 1-7.

Jin et al., Hardware Trojan Detection Using Path Delay Fingerprint, in 2008 IEEE International Workshop on Hardware-Oriented Security and Trust, pp. 51-57.

Lamech et al., Trojan Detection Based on Delay Variations Measured Using a High-Precision, Low-Overhead Embedded Test Structure, in 2012 IEEE International Symposium on Hardware-Oriented Security and Trust, pp. 75-82.

Li et al., At-Speed Delay Characterization for IC Authentication and Trojan Horse Detection, in 2008 IEEE International Workshop on Hardware-Oriented Security and Trust, pp. 8-14.

Rai et al., Performance of Delay-Based Trojan Detection Techniques Under Parameter Variations, in 2009 IEEE International Workshop on Hardware-Oriented Security and Trust (HOST), pp. 58-65.

Salmani et al., Layout-Aware Switching Activity Localization to Enhance Hardware Trojan Detection, IEEE Transactions on Information Forensics and Security, 2012, 7(1):76-87.

Salmani et al., A Novel Technique for Improving Hardware Trojan Detection and Reducing Trojan Activation Time, IEEE Transactions on Very Large Scale Integration (VLSI) Systems, 2012, 20(1):112-125.

Savnik, Index Data Structure for Fast Subset and Superset Queries, in International Conference on Availability, Reliability, and Security, 2013, pp. 134-148.

Wolff et al., Towards Trojan-Free Trusted ICs: Problem Analysis and Detection Scheme, in 2008 Design, Automation and Test in Europe, IEEE, pp. 1362-1365.

(56) References Cited

OTHER PUBLICATIONS

Xiao et al., A Clock Sweeping Technique for Detecting Hardware Trojans Impacting Circuits Delay, IEEE Design & Test, 2013, 30(2):26-34.

Yoshimizu, Hardware Trojan Detection by Symmetry Breaking in Path Delays, in 2014 IEEE International Symposium on Hardware-Oriented Security and Trust (HOST), pp. 107-111.

Zhang et al., Path-Delay Fingerprinting for Identification of Recovered ICs, in 2012 IEEE International Symposium on Defect and Fault Tolerance in VLSI and Nanotechnology Systems (DFT), pp. 13-18.

* cited by examiner

---

Algorithm 1 Rare path identification

---

Input: G = Combinational design (DAG), Switching activity
         file, Width of timing window (n $ns$)
Output: Unique rare triggering paths set
C = Determine the critical paths set
W = Determine the total number of windows

```
/* HT Triggering Nets                                    */
```
for *window in* W do

S$_w$={} // w $\in$ {1, W}
  counter = 0
  for *two consecutive activity time stamp in n* do

Mark gates that do not toggle ($N_T^G$)
    Return the path(s), $N_T^P$ from $N_T^G$
    if $N_T^P \notin C$ then
      | Append $N_T^P$ to S$_w$ // S$_w$ = $N_T^P$ : counter
    end end

Update the width of window by n
end
Return rare path(s) with label

FIG. 2A

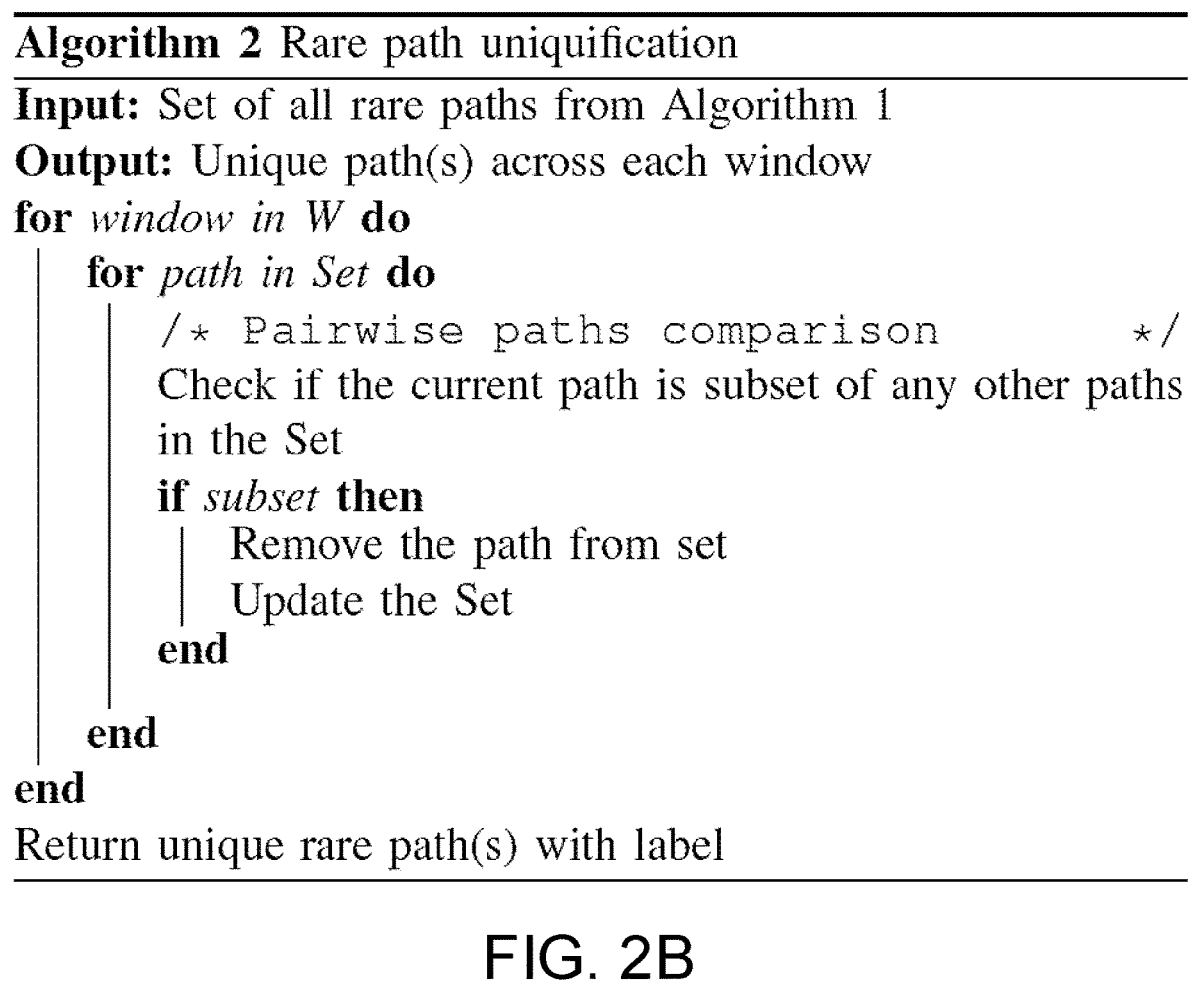

Algorithm 2 Rare path uniquification

Input: Set of all rare paths from Algorithm 1

Output: Unique path(s) across each window for *window in W* do for *path in Set* do

/* Pairwise paths comparison          */

Check if the current path is subset of any other paths in the Set if *subset* then

Remove the path from set

Update the Set end end end

Return unique rare path(s) with label

FIG. 2B

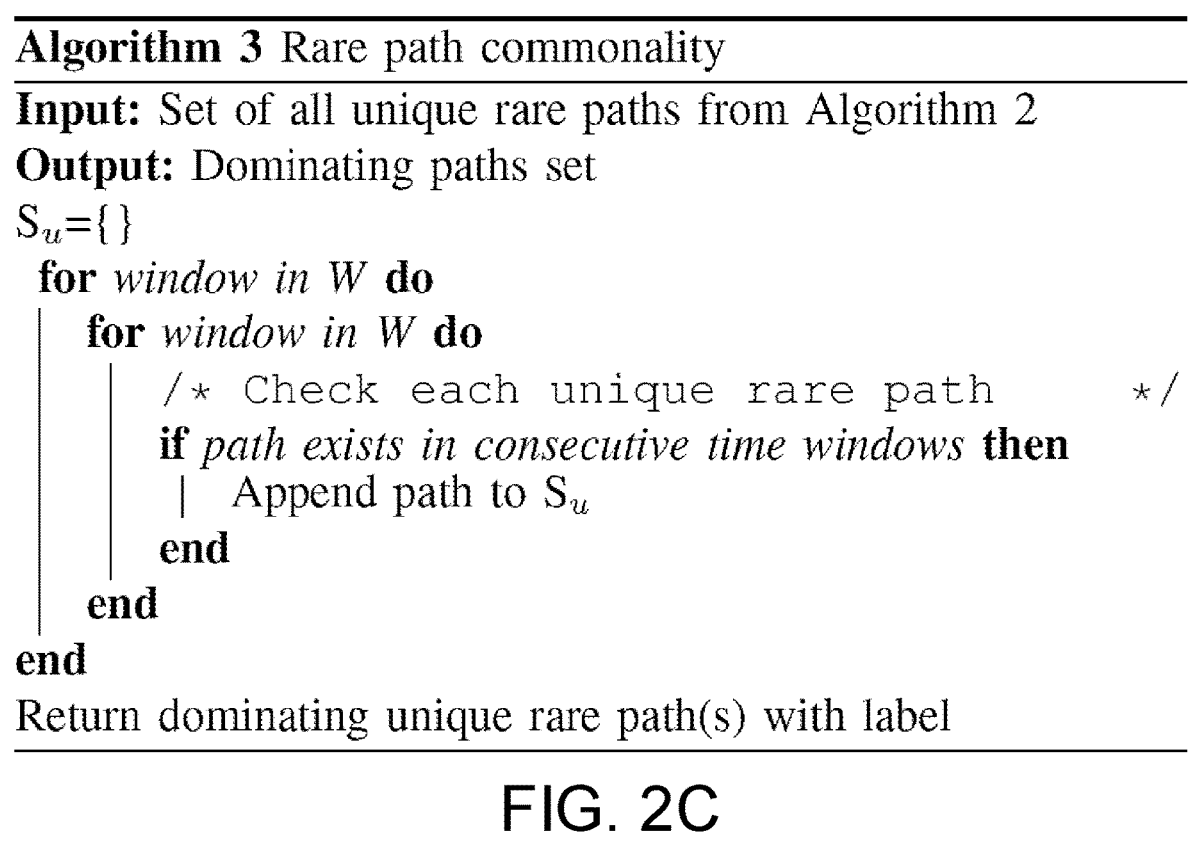

Algorithm 3 Rare path commonality

Input: Set of all unique rare paths from Algorithm 2
Output: Dominating paths set $S_u$={ }
  for *window in W* do
    for *window in W* do
      /* Check each unique rare path          */
      if *path exists in consecutive time windows* then
        | Append path to $S_u$
      end
    end
  end
end
Return dominating unique rare path(s) with label

FIG. 2C

GRAPH-BASED APPROACH TOWARDS HARDWARE TROJAN VULNERABILITY ANALYSIS

CROSS-REFERENCE TO RELATED APPLICATION

This application claims priority to U.S. provisional application entitled, "A Graph-Based Approach Towards Hardware Trojan Vulnerability Analysis," having Ser. No. 62/987,670, filed Mar. 10, 2020, which is entirely incorporated herein by reference.

BACKGROUND

A hardware trojan (HT) is a form of malicious manipulations that can be utilized by an attacker to launch different forms of attack. Traditionally, a hardware trojan impacts the profile of a design by changing a path length that is non-critical, less controllable, and less observable. Simultaneously, the signals in different paths are responsible to be simultaneously activated for hardware trojan triggering. Considering a single path to analyze the impact of a hardware trojan is manual and error-prone and limits the analysis whenever manufacturing variations impact the multiple paths instead of a single path. Hence, a graph-based scalable approach is needed to counteract a hardware trojan which can be masked by process variations. Also, the earliest and farthest activation times corresponding to the hardware trojan activation are equally important.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2C show exemplary algorithms (Algorithms 1, 2, and 3 respectively) for identifying a set of rare triggering paths for hardware trojan detection in accordance with various embodiments of the present disclosure.

DETAILED DESCRIPTION

Figure 1:
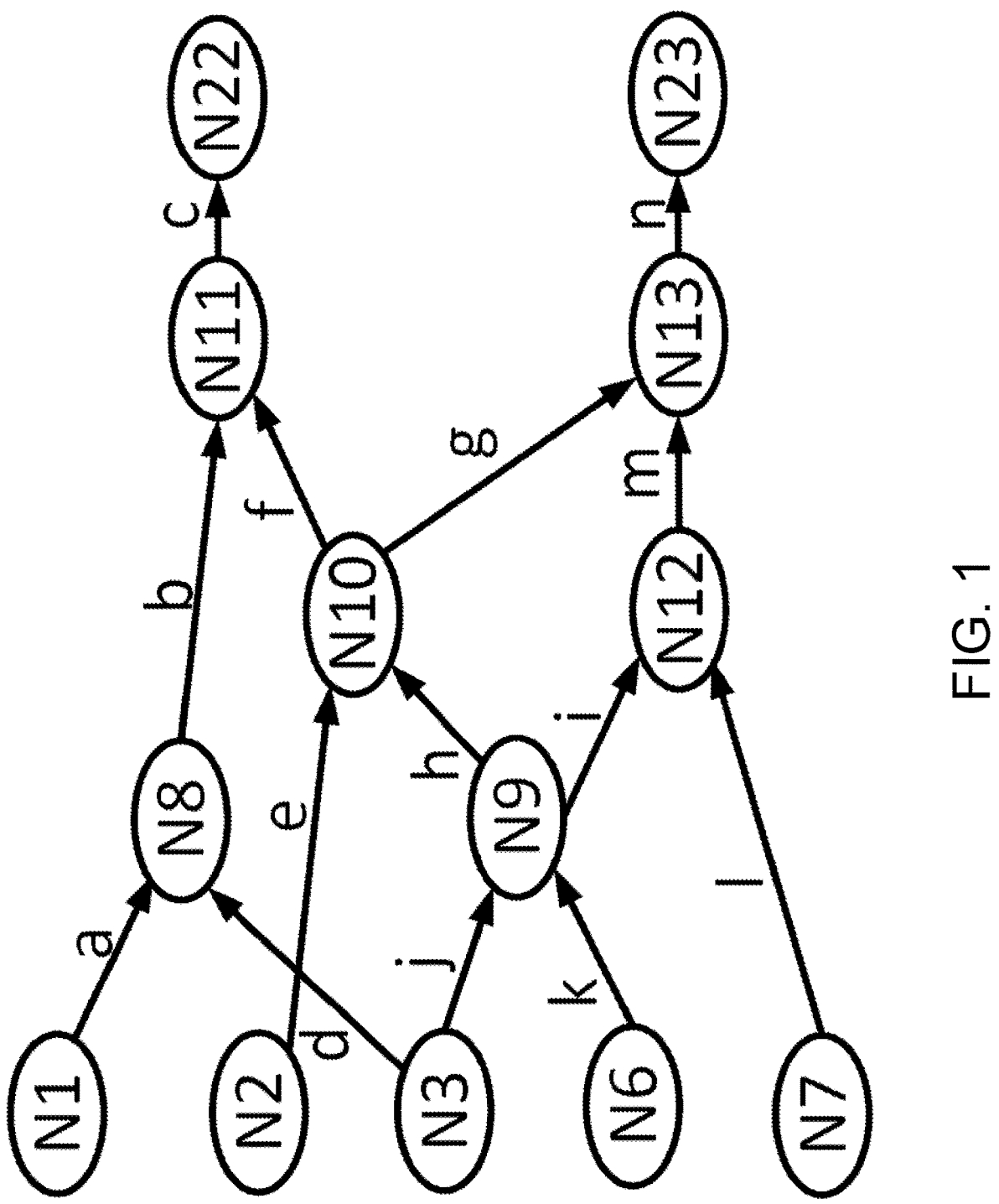
FIG. 1 shows a graphical representation of a generic c17 benchmark circuit without a hardware trojan trigger and payload in accordance with the present disclosure.

The present disclosure describes various embodiments of systems, apparatuses, and methods for hardware trojan triggering (HTT) signal analysis using an exemplary graph-based technique. Accordingly, a graph-based technique considers common properties of multiple paths simultaneously. As the localization of a hardware trojan is non-trivial, graph-based analysis exhibits a higher true positive detection rate than a contemporary path-based approach. An exemplary graph-based technique can be applied to a combinational hardware trojan of different activation techniques and is golden-design agnostic.

As an overview of the present disclosure, a set of theorems has been developed to identify a rare path followed by uniquification and commonality. Accordingly, techniques for detecting the presence of a hardware trojan under various different scenarios have been determined and the percentage detection rate in terms of different key parameters are reported in the present disclosure. An exemplary graph-based technique, in accordance with embodiments of the present disclosure, can help manufacturers understand the potential vulnerabilities early-on during a design and use the identified rare path(s) on manufactured products to detect malicious circuits For example, fabless semiconductor companies who port their design to the outside of the United States can use an exemplary approach of hardware trojan triggering analysis for detection of a hardware trojan before the product is shipped to an end-user.

Altogether, the distributed supply chain of modern, complex electronic systems has created a disruptive threat. One of the growing concerns is the opportunity of an attacker to embed malicious functionality in an electronic system during pre- and post-fabrication. As such, third-parties involved in the supply chain can perform intentional changes, known as a hardware trojan (HT). The stealthy behavior of a hardware trojan should be detected during an early stage of the design of the electronic system, which may invoke static analysis of an HT-free golden design using a simulation-based approach or runtime detection with additional circuitry. Both approaches are based on old information (such as identifying nets suitable for possible hardware trojan insertion). In such a case, a "test" of internal nets of the design provides a relationship between the activity of the internal nets and an input test vector. Correspondingly, the nets with the lowest activity during the simulation are generally involved in hardware trojan triggering (HTT). Moreover, the switching activity of the nets can vary within a wide range of values. An intelligent attacker can find a way of combining the rare nets with a variable toggle rate to trigger the hardware trojan. On the contrary, a defender can involve an analysis (e.g., path delays) at each rare net. In either case, the analysis of switching activity regarding an input vector can occur before HT insertion or detection.

Among all side-channel analyses to detect minute variations in design parameters, path delay based integrated circuit (IC) fingerprinting has become a popular direction to detect an HT. However, path delay measurement is susceptible to pessimistic manufacturing variations. Several prior works have studied how to improve the resolution of path-based timing analysis with an additional test structure and an on-chip time-to-digital converter.

In contrast, switching activity analysis of internal nets provides a noninvasive technique to investigate for a possible hardware trojan in a design. This analysis acts as the de-facto for improved test vector generation during pre-silicon and post-silicon stages while detecting a hardware trojan during functional testing. Moreover, the switching activity of a design (both HT-free and HT-affected) is input vector dependent, which can be generated randomly or following a spatial correlation. The functional signals at the internal nets of a golden design do not vary for multiple instances of a design for the same input test vector set which improves the confidence to determine the presence of the hardware trojan. Further, functional testing is independent of process parameters that make functional testing suitable for an attacker to simulate and find out or identify the rare switching nets. Such activity analysis also avoids expensive and destructive de-layering.

Many of the existing works that exhaustively measure the path parameters propose solutions to mask process variations and apply circuit testing principles to determine path variations due to the presence of a hardware trojan. For example, J. Li and J. Lach (in "At-Speed Delay Characterization for IC Authentication and Trojan Horse Detection," 2008 IEEE International Workshop on Hardware-Oriented Security and Trust, pp. 8-14 (June 2008)) propose to include a shadow register and a comparator along each path in the design to detect any alterations during test-time. This type of technique is based on traditional at-speed delay testing; however, the inclusion of additional test circuitry does not scale well for a design with billion gates of transistors. D. Rai and J. Lach (in "Performance of Delay-Based Trojan Detection Techniques under Parameter Variations," 2009 IEEE International Workshop on Hardware-Oriented Security and Trust, pp. 58-65 (July 2009)) present a technique to include a process variation with the assumption that the golden designs are available. As a hardware trojan impacts the path delay negatively, the authors measure clock skew-steps to observe the hardware trojan across each path. However, the measurement is limited as clock skew is performed for each path. Zhang et al. propose a signature-based detection scheme that calculates the fingerprint of multiple golden designs and compares the fingerprints with HT-infected designs. See X. Zhang, K. Xiao, and M. Tehranipoor, "Path-Delay Fingerprinting for Identification of Recovered ICS," 2012 IEEE International Symposium on Defect and Fault Tolerance in VLSI and Nanotechnology Systems (DFT), pp. 13-18 (October 2012); K. Xiao, X. Zhang, and M. Tehranipoor, "A Clock Sweeping Technique for Detecting Hardware Trojans Impacting Circuits Delay," IEEE Design Test, 30 (2), pp. 26-34 (April 2013). Although the technique is performed at different aging technique and times, the random path selection may not correctly stimulate HT localization. Moreover, the technique only compares the critical path delay to the signature. N. Yoshimizu (in "Hardware Trojan Detection by Symmetry Breaking in Path Delays," 2014 IEEE International Symposium on Hardware-Oriented Security and Trust (HOST), pp. 107-111 (May 2014)) provides a time-based measurement technique that would detect any break in path symmetry naturally present in the design. The author measures any change that violates the difference from any path to every other path in the design. As the delay distribution is not unique across all paths, the technique cannot improve the detection resolution when the process variation is present. Exurville et al. provides a path delay model to eliminate the inaccuracy due to process variations, in which the technique can handle process variations with a few golden designs. See I. Exurville, L. Zussa, J. Rigaud, and B. Robisson, "Resilient Hardware Trojans Detection Based on Path Delay Measurements," 2015 IEEE International Symposium on Hardware Oriented Security and Trust (HOST), pp. 151-156 (May 2015). On the other hand, in accordance with various embodiments of the present disclosure, a graph-based incremental window technique can be beneficially utilized to localize hardware trojan (HT) signals and determine their activation time. To do so, an exemplary incremental window technique stores toggle activity of nets during a test vector application.

The storing aspect of toggle activity of nets is considered for multiple reasons. First, for the period a vector takes to complete, one or more nets may not change their signal value. Alternatively, every net can switch ($0 \rightarrow 1$ or $1 \rightarrow 0$) depending on consecutive vector sequences. Secondly, any non-critical path segment can participate in triggering, and the detection of this path is NP-complete (Nondeterministic Polynomial-complete). To this end, a conventional path based estimation technique shows exponential runtime overhead.

Collectively, a graph-based approach provides general attributes that happen across multiple paths. Embodiments of the present disclosure uniquely apply graph-based analysis on the hardware trojan detection problem and is independent of a design stage (pre- or post-silicon); is a non-enumerative and scalable approach to determine any (possible) path delay variations; and provides robust path profiling to identify any particular segment of a path that can activate HT triggering using an incremental window and a graph-based approach. In contrast, a traditional path-based approach is not scalable (due to the large number of paths available in a design) and thus only considers a single path during analysis. While a hardware trojan signal can lie across multiple paths and have a different form of activation, the path-based analysis fails to consider this scenario.

Embodiments of systems and methods of the present disclosure utilize an incremental windowing technique based on a graph technique to detect the presence of a hardware trojan triggering (HTT) signal. In one embodiment, a switching activity file is generated during a simulation of a design and is analyzed. Based on a time window size of choice, paths of n-HT (n is the number of triggering signals) are extracted within the design, and path information is compared with the hardware trojan horse instances from a hardware trojan database to determine a particular HT's earliest/farthest activation time (corresponding to a range of times (begin time to a stop time)). Accordingly, paths that reside in time windows that match with a HT's activation time can be identified and output as rare trojan horse triggering paths for the design and an alert can be output if an identified path's activation time matches with a known trojan horse instance's activation time.

To illustrate, let's assume an attacker is in possession of a gate-level netlist, can embed out-of-spec components, and hence can perform malicious activity. The pre-silicon stage (algorithmic- and Register Transfer (RT)-level) before generating a synthesized netlist of a design is assumed to be HT-free. The assumption also aligns with an IP (intellectual property) owner who sells the legacy IP (soft IP in RTL format and HT-free) to the third-party. Hence, a system integrator as an insider attacker can subvert internal nets of any IP present in a System-On-Chip (SoC) design. During the post-silicon stage of the design, an attacker can reverse engineer the GDSII (Geometric Database Standard for Information Interchange) file of the SoC and change any low-level design parameters (e.g., doping, lithography mask, etc.) to mask any undesired behavior.

Given a netlist represented as a directed acyclic graph, G (V, E), systems and methods of the present disclosure, in one embodiment, aim to find a set of edges, S(e) (where, $e \in E$) within a time window ($t_\omega$) that can participate in n-HT triggering, where n denotes the cardinality of a set, S(e). Both S(e) and $t_\omega$ are user-defined. In essence, the time window should provide the earliest and/or farthest activation times of the individual n-HT triggering signal.

To aid in the discussion, the following definitions and terminology are provided. For a Non-Toggled Gate ($N_T^G$): If a net driven by a gate does not change its value over two (or more) consecutive clock cycles, the gate is called non-toggled. For a Non-Toggled Path ($N_T^P$): If all the nets driven by all gates present along a path do not change value over two (or more) consecutive clock cycles, the path is called non-toggled. For a Non-Toggled Set ($N_T^S$), all the non-toggled paths in the design are contained in this Non-Toggled Set. For Transition Activity ($T_c$), all toggle activity ($0 \rightarrow 1$, $1 \rightarrow 0$, $0 \rightarrow X \rightarrow 1$, $1 \rightarrow X \rightarrow 0$) across two or more clock cycles are contained in this set, assuming each test vector can complete within a cycle, where X refers to glitching activity due to early arriving input(s). Unless stated elsewhere in the present disclosure, toggle and transition activity are used interchangeably.

Next, let's consider a benign c17 benchmark circuit from ISCAS85, as shown in a graphical representation in FIG. 1. The c17 circuit design has five primary inputs and two primary outputs, and there are six critical paths that pass through node N9 and five non-critical paths. An attacker is less likely to insert a hardware trojan in critical paths to avoid accidental triggering. From a hardware trojan insertion perspective of an attacker, the following theorems are adopted using the c17 circuit as an illustrative guide.

Theorem 1: An Attacker is Unlikely to Use all $N_T^G$ in the Same Path to Trigger an HT.

Regarding Theorem 1, if one considers the non-critical path along N3-N8-N11 in the c17 circuit, an attacker would utilize the existing edges (d and b). However, the path should maintain two properties. First, the signal to the input of nodes (N1, N2, N3, N6) should not change across two consecutive cycles. As the nodes are independent, the application of an input vector to one particular primary input cannot control the input vector to another input. Furthermore, the input vector generation is random sampling-based. Second, for the same signal across two edges (d and b), nodes N2 and N3 should generate controlling signals in the test vector. Moreover, as the node N10 is reconvergent, it would show spatio-temporal correlation. So, an attacker should resort to $N_T^G$ from multiple paths. Accordingly, a defender should find a subset of gates ($N_T^G$) who would form a hardware trojan path to propagate triggering signals to an HTP (Hardware Trojan Payload).

Theorem 2: All $N_T^G$ do not Necessarily Form a Directed Acyclic Path.

Conversely and regarding Theorem 2, each path should have distinct endpoints (i.e., endpoints cannot be in same level). Mathematically, $N_T^{G,i}$ and $N_T^{G,j}$ can form a path if i≠j where i and j denote the leveling of $N_T^G$. For example, if the nodes N8 and N12 in the non-critical path do not toggle, nodes N8 and N12 form an acyclic path as both nodes as well as their edges (b and m) are in a different level. However, if nodes N8-N9 do not make any transition, nodes N8-N9 cannot form an HTT path as they are at the same level.

Theorem 3: An HTT Path can Contain $N_T^G$ from Multiple $N_T^P$. Alternatively, the $N_T^G$ within an HTT Path would be Unique.

For example, regarding Theorem 3, if the nodes N8-N10-N13 do not make any transition, the nodes can form an HTT path, although they are located in different paths in the design.

Theorem 4: In the Absence of Reconvergence Nodes (Paths), an Attacker can Choose $N_T^G$ to Control the HTT Path that Appears in a Single Path.

To illustrate Theorems 1-4, 20 test patterns were applied to a generic c17 benchmark circuit and reported the non-switching activity of the design with a period of 5 ns in Table I (below).

TABLE I

| Window Index | Time (ns) | $N_T^G$ | Window Index | Time (ns) | $N_T^G$ |
|---|---|---|---|---|---|
| 1 | 1 | X | 2 | 6 | N13 |
| | 2 | X | | 7 | X |
| | 3 | N10 | | 8 | N10 |

TABLE I-continued

| Window Index | Time (ns) | $N_T^G$ | Window Index | Time (ns) | $N_T^G$ |
|---|---|---|---|---|---|
| | 4 | N12 | | 9 | X |
| | 5 | X | | 10 | X |
| 3 | 11 | X | 4 | 16 | X |
| | 12 | N13 | | 17 | N8 |
| | 13 | N10 | | 18 | N10 |
| | 14 | X | | 19 | N13 |
| | 15 | N8 | | 20 | N9 |

Each pattern is assumed to be capable of propagating to the primary output in 1 ns and correspondingly, we have four windows.

For Window 1, the tables shows that nodes N10-N12 do not toggle over 5 ns. However, as nodes N10-N12 are at the same level, they cannot excite an HTT path (Theorem 1 and Theorem 2).

For Window 2, Nodes N13-N10 do not toggle over the next 5 ns. However, as they are at a different level and path, nodes N13-N10 can excite an HTT path (Theorem 1, Theorem 2, and Theorem 3).

For Window 3, Nodes N13-N10-N8 do not toggle between 11-15 ns. The nodes can form four different path to aid an attacker (N8-N10-N13, N8-N10, N10-N13, N8-N13). However, paths of unit length (N8-N10, N10-N13, N8-N13) are contained in path N8-N10-N13. This confirms that the unique paths set are a subset of the longest path within a time window if the nodes are leveled. Similarly, fault enumeration is possible to generate a compact test vector. For example, only four test vectors are generated to excite path N13-N10-N8 if one considers stuck-at-fault (0/1). On the contrary, paths (N8-N10, N10-N13, N8-N13) would require six test vectors for fault simulation. Furthermore, a defender can compare the path (superset) length across multiple windows and determine the shortest of superset path as a minimal segment of HTT. Hence, determining a superset of paths is beneficial.

For Window 4, the table shows that four nodes N8-N10-N13-N9 do not toggle from 16 ns to 20 ns. One sees a total of five paths are possible (four from window 3 and N9-N10-N13). However, the new path N9-N10-N13 is a segment of critical paths (N3-N9-N10-N13 and N6-N9-N10-N13); hence, an attacker would exclude this path. Moreover, path N8-N10-N13 is significant as they span across consecutive 10 ns. To determine the dominating $N_T^P$, a counter (start with 0) can be associated to each path. At the end of path profiling, the path(s) with the highest counter value indicate the dominating ones.

For each possible window, the non-toggled path $N_T^P$ is tagged or labeled with the window index where the start points and endpoints would determine earliest and farthest activation time windows. For example, path (N10-N13) would have three tags (2,3,4) as they are present in these windows. An attacker can use path (N10-N13) at the earliest (6-10 ns, corresponding to Window 2) and the farthest (16-20 ns, corresponding to Window 4) to trigger a hardware trojan. Similarly, a defender can activate this path segment (N10-N13) only during this time window (6 ns (which is the start point for Windows 2) to 20 ns (which is the endpoint for Window 4)) instead of visiting it across all applied test vectors. Moreover, one can get the statistics of n-HT. For example, n=1 denotes the paths (N8-N10, N10-N13, N8-N13) and n=2 indicates the two edges of the path (N8-N10-N13).

In accordance with various embodiments, systems and methods of the present disclosure can utilize incremental windowing algorithms for rare path(s) identification by identifying a set of rare triggering path (gates) based on the following algorithms. In various embodiments, techniques based on the following algorithms can complement existing path enumeration approaches for hardware trojan detection.

For rare path identification, the non-toggled path(s) within a user-defined time window can be computed from Algorithm 1 (as shown in FIG. 2A). To a defender, a single or multiple $N_T^P$ can participate in HT triggering. All $N_T^P$ can perform collusion to hide an individual $N_T^P$. Algorithm 1 can be used to detect all such paths as well as the $N_T^G$ that lie within a path. Algorithm 1 accepts a combinational design (HT-free or HT-infected), a switching activity file from a gate-level simulation, and a size of the timing window and begins by capturing critical paths and the total number of windows.

For each window, Algorithm 1 (FIG. 2A) initializes an empty set $S_w$ that can hold the $N_T^P$ and counter as an attribute of the $N_T^P$. Depending on the window size, Algorithm 1 progressively compares two consecutive timestamps of the activity file and records any non-toggled gate in the internal data structure. The comparison continues until the end of the window size is reached. Next, the algorithm looks for any possible path from $N_T^G$ and checks if the path appears as a segment in any of the critical paths by substring matching. The path is appended to the set $S_w$ only if it does not belong to the critical path. As there can be multiple paths from $N_T^P$, the algorithm stores all the multiple paths for future unification and commonality.

Intra-window path uniquification refers to a unique $N_T^P$ that is a superset of all sub-non-toggled paths within a time window, as shown in Algorithm 2 (FIG. 2B). Algorithm 2 (FIG. 2B) accepts all stored non-toggled paths from Algorithm 1 (FIG. 2A). By identifying a broad non-toggled path that contains all unique non-toggled paths, redundant comparison can be avoided and computation error due to delay variations caused across a path can be reduced. For a time window of interest, the unique path includes all excluded paths. To determine if any path is accommodated within another path in the same window, in one embodiment, the algorithm uses an algorithm (existsSuperset) from Savnik and Cherupalli et al. (I. Savnik, "Index data structure for fast subset and superset queries," Availability, Reliability, and Security in Information Systems and HCI, Springer Berlin Heidelberg (2013), pages 134-148 and H. Cherupalli and J. Sartori, "Graph-based Dynamic Analysis: Efficient Characterization of Dynamic Timing and Activity Distributions," Proceedings of the IEEE/ACM International Conference on Computer-Aided Design, ICCAD '15, IEEE Press, pp. 729-735 (2015)). The pairwise comparison is made until all $N_T^P$ are enumerated.

For Inter-window path commonality, Algorithm 3 (FIG. 2C) determines if each identified path(s) from Algorithm 2 (FIG. 2B) appears across multiple time windows. The key value (counter) of each unique, rare path is non-zero, and due to the nature of test vectors, it is highly likely the same path appears multiple times. In each iteration of the window in Algorithm 3 (FIG. 2C), the path(s) belonging to the outer loop is compared against all paths for all internal windows. If the path appears across the window segment, the algorithm appends the path to set $S_u$. At the end of the iteration, an attacker would probably choose the path(s) with the highest counter value. Similarly, the attacker can select a different path(s) with a different counter value. However, in reality, the number of such paths is low compared to the total available path(s) in the design.

For analysis purposes, experiments with an exemplary incremental windowing technique on over 400 combinational hardware trojan horse instances for four combinational designs were performed. From the testing, results indicate that a small and stealthy hardware trojan is active for a limited set of the time window and the number of test patterns during these windows is compact as compared to an exhaustive traditional random vector based ATPG (Automatic Test Pattern Generator).

In particular, the feasibility of an exemplary graph-based approach for combinational HT localization on benign and HT-infected designs was evaluated. The designs were collected from Cruz, et al. (J. Cruz, Y. Huang, P. Mishra, and S. Bhunia, "An automated configurable trojan insertion framework for dynamic trust benchmarks," 2018 Design, Automation Test in Europe Conference Exhibition (DATE) (March 2018), pages 1598-1603). The dataset contained four benign designs and 410 infected designs. The switching activity of each benign design was generated for 1000 random test vectors and correlated test vectors using Synopsys VCS-MX. The time to apply each test vector and propagate through the rest of the design was bound to 1 ns. The Switching Activity Interchange File (SAIF) file was processed through Algorithms 1-3 (FIGS. 2A-2C). Due to the large design size, the process of detection was automated using a script. As we aim to detect only HT triggering signals, the success rate (%) was measured under three categories for two types of vector generation technique: Full Detection (FD), Partial Detection (PD), and No Detection (ND). If the total number of HTT signals is n, the percentage is reported if the technique can identify any HTT signal ranging from 1 to n–1.

To be characterized as Full Detection, the technique is able to detect the HTT signals successfully and return their activation time (earliest and farthest). For Partial Detection, the technique is able to detect partial HTT signals and return the activation time of these signals only. For No Detection (ND), the technique is not able to detect any HTT signal.

For analysis purposes, a hardware trojan having 4 triggering nets is considered; however, an exemplary approach in accordance with various embodiments of the present disclosure is applicable for nets less or more than four at the cost of higher memory footprint and runtime. Table II (below) reports the success rate (%) of detection for four combinational designs.

TABLE II

| Design | HT instances | Random Test Vector | | | Correlated Test Vector | | |
|---|---|---|---|---|---|---|---|
| | | FD | PD | ND | FD | PD | ND |
| c2670 | 100 | 80% | 15% | 5% | 88% | 10% | 2% |
| c3540 | 100 | 87% | 10% | 3% | 90% | 8% | 2% |
| c5315 | 110 | 79% | 13% | 8% | 86% | 11% | 3% |
| c6288 | 110 | 81% | 9% | 10% | 90% | 5% | 5% |
| Average | | 81.75% | 11.75% | 6.5% | 88.5% | 8.5% | 3% |

On average, an exemplary technique of the present disclosure was tested to be able to fully detect 81.75% and partially detect 11.75% of random test vectors. For correlated test vectors, the detection technique improves by 8.25% for FD as it considers the reconvergence present in the design. As the designs exhibit different activation times, each HT-infected design was not reported. Instead, the percentage of HT designs was included that fall under a particular time-window in Table III (below), in which only the fraction of full detection is tabulated in various times for a correlated test vector-based simulation.

TABLE III

| | Earliest | | Farthest | |
|---|---|---|---|---|
| Design | Time (ns) | FD (%) | Time (ns) | FD (%) |
| c2670 | 10-20 | 10 | 980-990 | 7 |
| | 20-30 | 12 | 970-980 | 6 |
| | 30-40 | 8 | 960-970 | 14 |
| | 40-50 | 10 | 950-960 | 5 |
| | 50-60 | 15 | 940-950 | 1 |
| | Total | 55 | | 33 |
| c3540 | 5-15 | 5 | 985-995 | 11 |
| | 20-30 | 8 | 960-970 | 5 |
| | 35-45 | 15 | 935-945 | 15 |
| | 55-65 | 10 | 915-925 | 12 |
| | 70-80 | 9 | | |
| | Total | 47 | | 43 |
| c5315 | 15-25 | 2 | 990-995 | 4 |
| | 30-40 | 10 | 980-985 | 14 |
| | 45-55 | 8 | 965-970 | 12 |
| | 65-75 | 15 | 945-950 | 16 |
| | 80-90 | 5 | | |
| | Total | 40 | | 46 |
| c6288 | 10-15 | 14 | 980-995 | 6 |
| | 20-25 | 10 | 950-965 | 18 |
| | 30-35 | 15 | 915-930 | 9 |
| | 45-50 | 2 | 890-905 | 15 |
| | 55-60 | 1 | | |
| | Total | 42 | | 48 |

In accordance with embodiments of the present disclosure, systems and methods for a graph-based approach to detect rare trojan horse triggering paths are (a) scalable in that they can consider any non-critical path and its segment using a lightweight data structure, (b) able to provide dynamic analysis without any golden design, and/or (c) able to complement static timing analysis by checking any variation in path length, which is unlike previous approaches.

Figure 3:
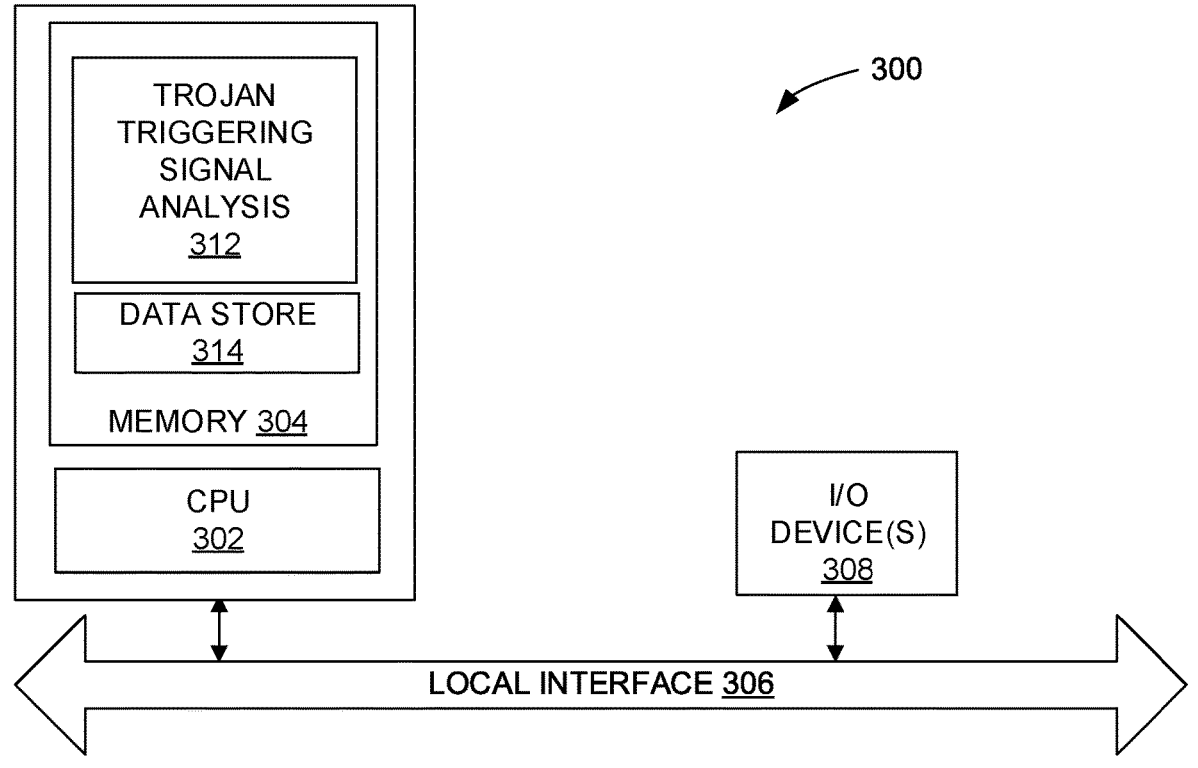
FIG. 3 shows a schematic block diagram of a computing device that can be used to implement various embodiments of the present disclosure.

FIG. 3 depicts a schematic block diagram of a computing device 300 that can be used to implement various embodiments of the present disclosure. An exemplary computing device 300 includes at least one processor circuit, for example, having a processor (CPU) 302 and a memory 304, both of which are coupled to a local interface 306, and one or more input and output (I/O) devices 308. The local interface 306 may comprise, for example, a data bus with an accompanying address/control bus or other bus structure as can be appreciated.

Stored in the memory 304 are both data and several components that are executable by the processor 302. In particular, stored in the memory 304 and executable by the processor 302 are trojan triggering signal analysis logic/ instructions 312 (e.g., Algorithm 1 (FIG. 2A), Algorithm 2 (FIG. 2B), and/or Algorithm 3 (FIG. 2C)) that are configured to identify paths in a design that can trigger a hardware trojan (HT). Also stored in the memory 304 may be a data store 314 and other data. The data store 314 can include a netlist for a circuit design, a switching activity file that indicates switching activity of the design, hardware trojan horse instances, rare trojan horse triggering paths, and potentially other data. In addition, an operating system may be stored in the memory 304 and executable by the processor 302. The I/O devices 308 may include input devices, for example but not limited to, a keyboard, mouse, etc. Furthermore, the I/O devices 308 may also include output devices, for example but not limited to, a printer, display, etc.

Certain embodiments of the present disclosure can be implemented in hardware, software, firmware, or a combination thereof. If implemented in software, the trojan triggering signal analysis logic or functionality are implemented in software or firmware, the contents of which can be stored in computer readable media, such as memory, and that is executed by a suitable instruction execution system. If implemented in hardware, the trojan triggering signal analysis logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A non-transitory computer readable storage medium having instructions stored thereon that, in response to execution by a computing device, cause the computing device to:

detect a hardware trojan triggering signal in a design of an integrated circuit, using a graph-based analysis that is golden-design agnostic comprising:

performing a simulation of an application of a test pattern running on an integrated circuit having the design, which simulates gate-level activity of the integrated circuit;

capturing switching activity of nodes for the design of the integrated circuit during the simulation;

identifying one or more nodes in a graphical representation of the design that do not toggle within an individual window of time of a sequence of multiple, non-overlapping windows of time during the simulation, wherein each window of time has a same period comprising a predetermined time period of two or more consecutive clock cycles;

identifying a set of rare paths of the design for each window of the sequence of multiple, non-overlapping windows of time, wherein each rare path for a given window:

is comprised of two or more nodes identified as not having toggled within the given window;

has distinct endpoints which are not in the same graph level; and is not a segment of a critical path of the design;

determining a subset of unique rare paths of the set of rare paths for each window of the sequence of multiple non-overlapping windows of time, wherein each unique rare path is not a segment of another rare path within a same window;

identifying one or more unique rare paths of the design that occur across consecutive windows of time;

appending the one or more unique rare paths that occur across the consecutive windows of time in a set of dominating unique rare paths; and output the one or more unique rare paths in the set of dominating unique rare paths as rare trojan horse triggering paths for the design.

2. The non-transitory computer readable medium of claim 1, wherein the instructions further cause the computing device to:

determine a range of activation times for one of the rare trojan horse triggering paths; and output the range of activation time for at least one of the rare trojan horse triggering paths.

3. The non-transitory computer readable medium of claim 2, wherein the range of activation times is determined by identifying a beginning for the range corresponding to a start point for an earliest one of the consecutive windows of time for the rare trojan horse triggering path and identifying an end for the range corresponding to an endpoint for a farthest one of the consecutive windows of time for the rare trojan horse triggering path.

4. The non-transitory computer readable medium of claim 2, wherein the instructions further cause the computing device to compare the range of activation times for the at least one of the rare trojan horse triggering paths with an activation time range of an existing hardware trojan horse instance and output an alert when the range of activation times matches with the activating time range of the existing hardware trojan horse instance.

5. The non-transitory computer readable medium of claim 2, wherein the graphical representation of the design comprises a netlist represented as a directed acyclic graph.

6. A system comprising:

a processor; and a memory having instructions that, when executed by the processor, cause the processor to:

detect a hardware trojan triggering signal in a design of an integrated circuit, using a graph-based analysis that is golden-design agnostic comprising:

performing a simulation of an application of a test pattern running on an integrated circuit having the design, which simulates gate-level activity of the integrated circuit;

capturing switching activity of nodes for the design of the integrated circuit during the simulation;

identifying one or more nodes in a graphical representation of the design that do not toggle within an individual window of time of a sequence of multiple, non-overlapping windows of time during the simulation, wherein each window of time has a same period comprising a predetermined time period of two or more consecutive clock cycles;

identifying a set of rare paths of the design for each window of the sequence of multiple, non-overlapping windows of time, wherein each rare path for a given window:

is comprised of two or more nodes identified as not having toggled within the given window;

has distinct endpoints which are not in the same graph level; and is not a segment of a critical path of the design;

determining a subset of unique rare paths of the set of rare paths for each window of the sequence of multiple non-overlapping windows of time, wherein each unique rare path is not a segment of another rare path within a same window;

identifying one or more unique rare paths of the design that occur across consecutive windows of time;

appending the one or more unique rare paths that occur across the consecutive windows of time in a set of dominating unique rare paths; and output the one or more unique rare paths in the set of dominating unique rare paths as rare trojan horse triggering paths for the design.

7. The system of claim 6, wherein the instructions further cause the processor to:

determine a range of activation times for one of the rare trojan horse triggering paths; and output the range of activation time for at least one of the rare trojan horse triggering paths.

8. The system of claim 7, wherein the range of activation times is determined by identifying a beginning for the range corresponding to a start point for an earliest one of the consecutive windows of time for the rare trojan horse triggering path and identifying an end for the range corresponding to an endpoint for a farthest one of the consecutive windows of time for the rare trojan horse triggering path.

9. The system of claim 7, wherein the instructions further cause the processor to compare the range of activation times for the at least one of the rare trojan horse triggering paths with an activation time range of an existing hardware trojan horse instance and output an alert when the range of activation times matches with the activating time range of the existing hardware trojan horse instance.

10. The system of claim 7, wherein the graphical representation of the design comprises a netlist represented as a directed acyclic graph.

11. A method comprising:

detecting, by a computing device, a hardware trojan triggering signal in a design of an integrated circuit, using a graph-based analysis that is golden-design agnostic comprising:

performing a simulation of an application of a test pattern running on an integrated circuit having the design, which simulates gate-level activity of the integrated circuit;

capturing switching activity of nodes for the design of the integrated circuit during the simulation;

identifying one or more nodes in a graphical representation of the design that do not toggle within an individual window of time of a sequence of multiple, non-overlapping windows of time during the simulation, wherein each window of time has a same period comprising a predetermined time period of two or more consecutive clock cycles;

identifying a set of rare paths of the design for each window of the sequence of multiple, non-overlapping windows of time, wherein each rare path for a given window:

is comprised of two or more nodes identified as not having toggled within the given window;

has distinct endpoints which are not in the same graph level; and is not a segment of a critical path of the design;

determining a subset of unique rare paths of the set of rare paths for each window of the sequence of multiple non-overlapping windows of time, wherein each unique rare path is not a segment of another rare path within a same window;

identifying one or more unique rare paths of the design that occur across consecutive windows of time;

appending the one or more unique rare paths that occur across the consecutive windows of time in a set of dominating unique rare paths; and outputting the one or more unique rare paths in the set of dominating unique rare paths as rare trojan horse triggering paths for the design.

12. The method of claim 11, further comprising:

determining, by the computing device, a range of activation times for one of the rare trojan horse triggering paths; and outputting, by the computing device, the range of activation time for at least one of the rare trojan horse triggering paths.

13. The method of claim 12, wherein the range of activation times is determined by identifying a beginning for the range corresponding to a start point for an earliest one of the consecutive windows of time for the rare trojan horse triggering path and identifying an end for the range corresponding to an endpoint for a farthest one of the consecutive windows of time for the rare trojan horse triggering path.

14. The method of claim 12, further comprising comparing the range of activation times for the at least one of the rare trojan horse triggering paths with an activation time range of an existing hardware trojan horse instance and outputting an alert when the range of activation times matches with the activating time range of the existing hardware trojan horse instance.

15. The method of claim 12, wherein the graphical representation of the design comprises a netlist represented as a directed acyclic graph.

\* \* \* \* \*